United States Patent
Matsushita (10) Patent No.: US 9,474,024 B2
(45) Date of Patent: Oct. 18, 2016

(54) MOBILE COMMUNICATION APPARATUS SWITCHING ON AND OFF STATE WITH DISTANCE FROM COMMUNICATING EXTERNAL APPARATUS

(71) Applicant: DENSO CORPORATION, Kariya, Aichi-pref. (JP)

(72) Inventor: Suguru Matsushita, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/763,332

(22) PCT Filed: Dec. 5, 2013

(86) PCT No.: PCT/JP2013/007142
§ 371 (c)(1),
(2) Date: Jul. 24, 2015

(87) PCT Pub. No.: WO2014/115217
PCT Pub. Date: Jul. 31, 2014

(65) Prior Publication Data
US 2015/0365898 A1     Dec. 17, 2015

(30) Foreign Application Priority Data

Jan. 28, 2013 (JP) ................. 2013-013488

(51) Int. Cl.
| | |
|---|---|
| H04W 88/02 | (2009.01) |
| H04W 4/02 | (2009.01) |
| H04W 52/02 | (2009.01) |
| H04M 1/725 | (2006.01) |
| H04W 4/04 | (2009.01) |

(52) U.S. Cl.
CPC ....... *H04W 52/0229* (2013.01); *H04M 1/7253* (2013.01); *H04M 1/72569* (2013.01); *H04W 4/023* (2013.01); *H04W 4/046* (2013.01); *H04W 52/028* (2013.01); *H04W 52/0254* (2013.01); *H04W 88/02* (2013.01)

(58) Field of Classification Search
None
See application file for complete search history.

(56) References Cited

U.S. PATENT DOCUMENTS

| | | |
|---|---|---|
| 2005/0282573 A1 | 12/2005 | Maeno |
| 2012/0244814 A1 | 9/2012 | Okayasu |

FOREIGN PATENT DOCUMENTS

| | | |
|---|---|---|
| JP | 2001218262 A | 8/2001 |
| JP | 2004032408 A | 1/2004 |

(Continued)

OTHER PUBLICATIONS

International Search Report and Written Opinion (in Japanese with English Translation) for PCT/JP2013/007142, mailed Jan. 7, 2014; ISA/JP.

*Primary Examiner* — Philip Sobutka
(74) *Attorney, Agent, or Firm* — Harness, Dickey & Pierce, P.L.C.

(57) ABSTRACT

According to a mobile communication apparatus, an external apparatus location storage processor stores an external apparatus location acquired by an external apparatus location acquisition processor. A wireless communication switching processor switches a wireless communication function from OFF state to ON state if the distance between a mobile communication apparatus location acquired by a mobile communication apparatus location acquisition processor and the external apparatus location stored by the external apparatus location storage processor is shorter than a predetermined distance, and switches the wireless communication function from ON state to OFF state if the distance is longer than the predetermined distance.

10 Claims, 6 Drawing Sheets

(56) References Cited

FOREIGN PATENT DOCUMENTS

| | | |
|---|---|---|
| JP | 2005106834 A | 4/2005 |
| JP | 2006005577 A | 1/2006 |
| JP | 2007300650 A | 11/2007 |
| JP | 2010166233 A | 7/2010 |
| JP | 2010202043 A | 9/2010 |
| JP | 2010273227 A | 12/2010 |
| JP | 2012204845 A | 10/2012 |

| STATE | BEFORE ENTERING VEHICLE | WHEN ENTERING VEHICLE | IN VEHICLE | WHEN EXITING VEHICLE | AFTER EXITING VEHICLE |
|---|---|---|---|---|---|
| WIRE-LESS | OFF | OFF → ON AUTO | ON | ON → OFF AUTO | OFF |

MOBILE COMMUNICATION APPARATUS SWITCHING ON AND OFF STATE WITH DISTANCE FROM COMMUNICATING EXTERNAL APPARATUS

CROSS REFERENCE TO RELATED APPLICATIONS

This application is a U.S. National Phase Application under 35 U.S.C. 371 of International Application No. PCT/JP2013/007142 filed on Dec. 5, 2013 and published in Japanese as WO 2014/115217 A1 on Jul. 31, 2014. This application is based on and claims the benefit of priority from Japanese Patent Application No. 2013-13488 filed on Jan. 28, 2013. The entire disclosures of all of the above applications are incorporated herein by reference.

TECHNICAL FIELD

The present disclosure relates to a mobile communication apparatus, and to a storage medium including a program product operating in the mobile communication apparatus.

BACKGROUND ART

In recent years, a technology is contemplated which uses a wireless communication function standardized on a mobile communication apparatus such as smartphone for operating the mobile communication apparatus and an external apparatus other than the mobile communication apparatus (e.g., a vehicle-mounted apparatus) in coordination with each other. A technology disclosed, for instance, in Patent Literature 1 establishes hands-free communication by coordinating a mobile communication apparatus with a vehicle-mounted apparatus through the use of a Bluetooth (registered trademark) communication function incorporated in the mobile communication apparatus. Further, applications for a mobile communication apparatus that causes the mobile communication apparatus to operate in coordination with an external apparatus are vigorously developed in recent years.

PRIOR ART LITERATURES

Patent Literature

Patent Literature 1: JP 2012-204845 A

SUMMARY OF INVENTION

Incidentally, before running such applications on a mobile communication apparatus, it is necessary to turn on a wireless communication function for establishing wireless communication with an external apparatus. However, the mobile communication apparatus, such as a smartphone, consumes battery power relatively quickly. Thus, in the present circumstances, the wireless communication function is normally turned off in order to reduce the amount of battery power consumption. In most cases, a user performs a manual procedure to turn on the wireless communication function only when it is required. In this instance, however, user-friendliness is sacrificed because the user has to perform such a manual switching procedure.

In view of the above circumstances, the present disclosure provides a mobile communication apparatus capable of turning on and off the wireless communication function without sacrificing user-friendliness. The present disclosure also provides a storage medium including a program product operating in the mobile communication apparatus.

According to an example of the present disclosure, a mobile communication apparatus is provided as follows. A second location storage processor stores an external apparatus location acquired by a second location acquisition processor. A wireless communication switching processor switches a wireless communication function from OFF state to ON state when a distance between a mobile communication apparatus location acquired by a first location acquisition processor and the external apparatus location stored by the second location storage processor is shorter than a predetermined distance. Further, the wireless communication switching processor switches the wireless communication function from ON state to OFF state when the distance between the mobile communication apparatus location acquired by the first location acquisition processor and the external apparatus location stored by the second location storage processor is longer than the predetermined distance.

In other words, the mobile communication apparatus automatically turns on or off the wireless communication function according to the distance between the pre-stored location of the external apparatus and the location of the mobile communication apparatus that moves together with its user. This saves the user from having to perform a manual switching procedure and enables to turn on or off the wireless communication function without sacrificing user-friendliness.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the present disclosure will now be described with reference to the accompanying drawings. Substantially identical elements in the embodiments are designated by the same reference numerals and will not be redundantly described.

First Embodiment

Figure 1:
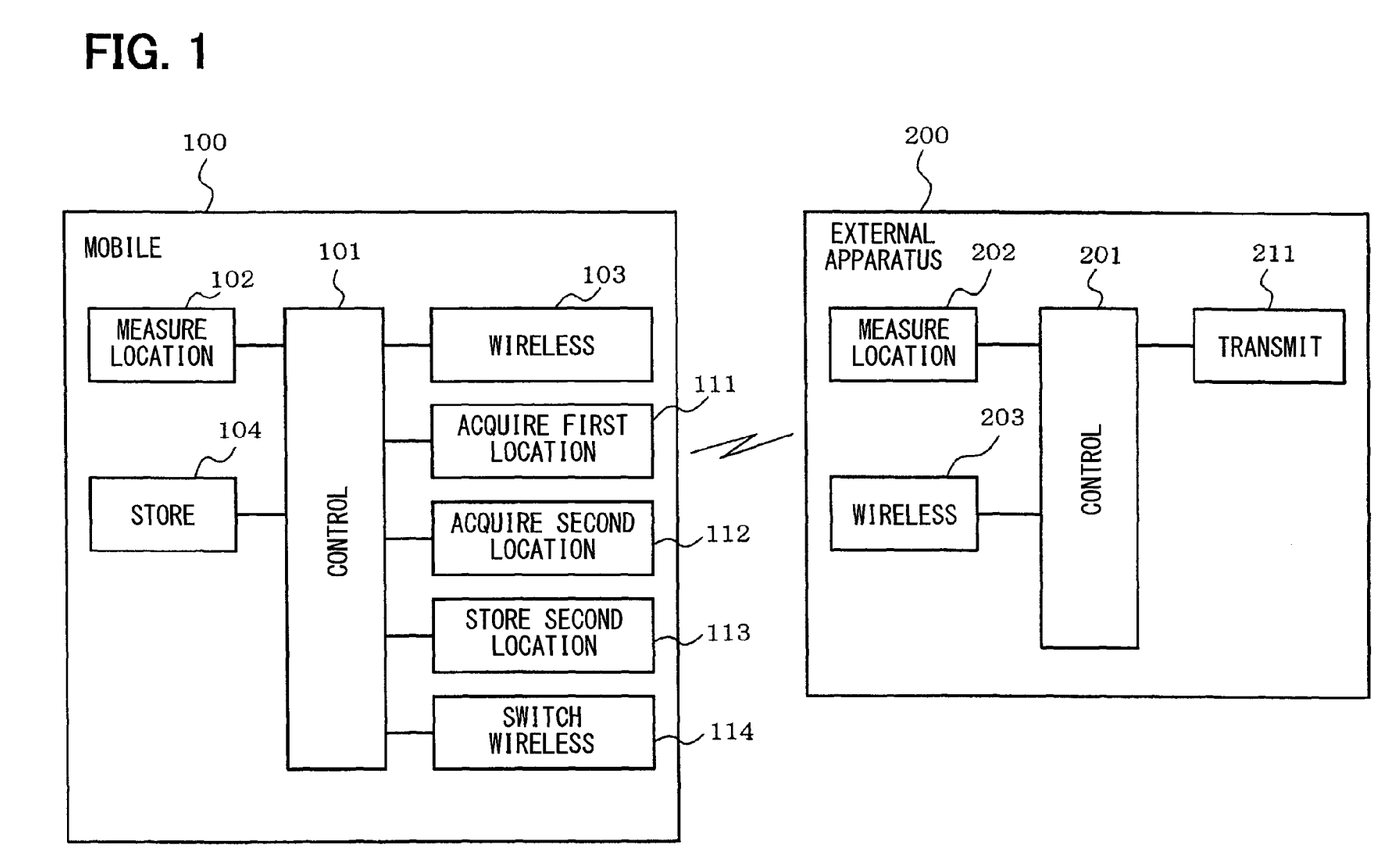
FIG. 1 is a schematic functional block diagram illustrating a configuration of a mobile communication apparatus and an external apparatus according to a first embodiment.

As in FIG. 1, a mobile communication apparatus 100 is formed, for instance, of a multifunctional mobile telephone (smartphone) and has a wireless communication function for wirelessly communicating with an external apparatus 200. The mobile communication apparatus 100 includes a control portion 101, a location detection portion 102, a wireless communication portion 103, and an information storage portion 104. The control portion 101 is formed of a well-known microcomputer that includes a CPU, a RAM, a ROM, and an I/O bus, which are unshown. The control portion 101 provides overall operational control of the mobile communication apparatus 100 according to a computer program stored, for instance, in the ROM or in the information storage portion 104. Further, the control portion 101 executes software, namely, a control program including a program for the mobile communication apparatus, to virtually implement a mobile communication apparatus location acquisition processor 111, an external apparatus location acquisition processor 112, an external apparatus location storage processor 113, and a wireless communication switching processor 114. The mobile communication apparatus location acquisition processor 111 corresponds to a mobile communication apparatus location acquisition device or means. The external apparatus location acquisition processor 112 corresponds to an external apparatus location acquisition device or means. The external apparatus location storage processor 113 corresponds to an external apparatus location storage device or means. The wireless communication switching processor 114 corresponds to a wireless communication switching device or means. These processors 111-114 may be implemented by hardware such as an integrated circuit integral with the control portion 101. The location of the mobile communication apparatus may be referred to as a first location. The location of the external apparatus may be referred to as a second location. The mobile communication apparatus location acquisition processor 111 may be referred to as a first location acquisition processor 111. The external apparatus location acquisition processor 112 may be referred to as a second location acquisition processor 112. The external apparatus location storage processor 113 may be referred to as a second location storage processor 113.

The location detection portion 102 includes a receiver for receiving location detection satellite electric waves and various location sensors such as a gyro sensor, and detects the location of the mobile communication apparatus 100 according to detection signals input from the sensors. The location detection portion 102 then outputs the detected location, i.e., mobile communication apparatus location information indicative of the mobile communication apparatus location, to the control portion 101.

The wireless communication portion 103 includes a wireless communication module and is capable of switching between an "on" state and an "off" state according to a switching signal input from the control portion 101. When the "on" state is selected, the wireless communication portion 103 automatically establishes a wireless communication link with the external apparatus existing within a range of communication. This enables the mobile communication apparatus 100 to wirelessly communicate with the external apparatus. The communication range covered by the wireless communication portion 103 can be variously set as appropriate. However, the communication range is initially set so as to cover a compartment of a vehicle (e.g., a radius of approximately 1 m from the mobile communication apparatus 100).

When, by contrast, the "off" state is selected, the wireless communication portion 103 actively cuts off the wireless communication link established with the external apparatus. This disables the mobile communication apparatus 100 from wireless communicating with the external apparatus. The mobile communication apparatus 100 may incorporate various wireless communication functions such as a Bluetooth communication function, a Wi-Fi communication function, and a near field communication (NFC) function.

The information storage portion 104 includes a storage medium such as a hard disk drive or a memory card and has a storage region for storing various information. The information storage portion 104 includes at least a storage region that stores external apparatus location information acquired from the external apparatus 200.

The mobile communication apparatus location acquisition processor 111 performs a mobile communication apparatus location acquisition process to constantly acquire the mobile communication apparatus location information outputted from the location detection portion 102. Thus, the mobile communication apparatus 100 constantly acquires latest information about its location, i.e., current location information about itself. The external apparatus location acquisition processor 112 performs an external apparatus location acquisition process to acquire (receive) external apparatus location information, which will be described in detail later, from the external apparatus 200 through the wireless communication portion 103. The external apparatus location storage processor 113 performs an external apparatus location storage process to store the external apparatus location information acquired by the external apparatus location acquisition processor 112 in the information storage portion 104.

The wireless communication switching processor 114 performs a wireless communication switching process to calculate the distance between the location of the mobile communication apparatus and the location of the external apparatus. The location of the mobile communication apparatus (the location identified by the mobile communication apparatus location information) is acquired by the mobile communication apparatus location acquisition processor 111. The location of the external apparatus (the location identified by the external apparatus location information stored in the information storage portion 104) is stored by the external apparatus location storage processor 113. If the calculated distance is shorter than a predetermined distance, the wireless communication switching processor 114 automatically switches the wireless communication function (wireless communication portion 103) incorporated in the mobile communication apparatus 100 from the "off" state to the "on" state. If the calculated distance is longer than the predetermined distance, the wireless communication switching processor 114 automatically switches the wireless communication function (wireless communication portion 103) incorporated in the mobile communication apparatus 100 from the "on" state to the "off" state. The predetermined distance can be changed as appropriate. A value of approximately 8 to 10 m is initially set as the predetermined distance. If the calculated distance is equal to the predetermined distance, the wireless communication switching processor 114 may switch the wireless communication function or leave the wireless communication function unswitched.

A configuration of the external apparatus 200 will now be described. The external apparatus 200 is formed of a vehicle apparatus such as a vehicle-mounted navigation unit and has a wireless communication function for wirelessly communicating with the mobile communication apparatus 100. The external apparatus 200 includes a control portion 201, a location detection portion 202, and a wireless communication portion 203. The control portion 201 is formed of a well-known microcomputer that includes a CPU, a RAM, a ROM, and an I/O bus, which are unshown. The control portion 201 provides overall operational control of the external apparatus 200 according to a computer program stored, for instance, in the ROM or in an information storage portion unshown. Further, the control portion 201 executes software, namely, a control program including a program for the external apparatus, to virtually implement an information transmission processor 211. The information transmission processor 211 may be implemented by hardware such as an integrated circuit integral with the control portion 201.

The location detection portion 202 includes a receiver for receiving location detection satellite electric waves and various location sensors such as a gyro sensor, and detects the location of the external apparatus 200 according to detection signals input from the sensors. The location detection portion 202 then outputs the detected location, i.e., external apparatus location information indicative of the external apparatus location, to the control portion 201.

The wireless communication portion 203 includes a wireless communication module. When a wireless communication link is established with the mobile communication apparatus 100 existing within a range of communication, the wireless communication portion 203 provides various wireless communications with the mobile communication apparatus 100 through the wireless communication link. The communication range covered by the wireless communication portion 203 can be changed as appropriate. However, as is the case with the wireless communication portion 103, the communication range is initially set so as to cover the compartment of the vehicle (e.g., a radius of approximately 1 m from the external apparatus 200). It is assumed that the wireless communication function (wireless communication portion 203) of the external apparatus 200 is basically kept on under normal conditions. The information transmission processor 211 transmits various information, such as the external apparatus location information outputted from the location detection portion 202, to the mobile communication apparatus 100 through the wireless communication portion 203.

Exemplary operations performed by the mobile communication apparatus 100 and the external apparatus 200 will now be described.

(External Apparatus Location Storage Process)

Figure 2:
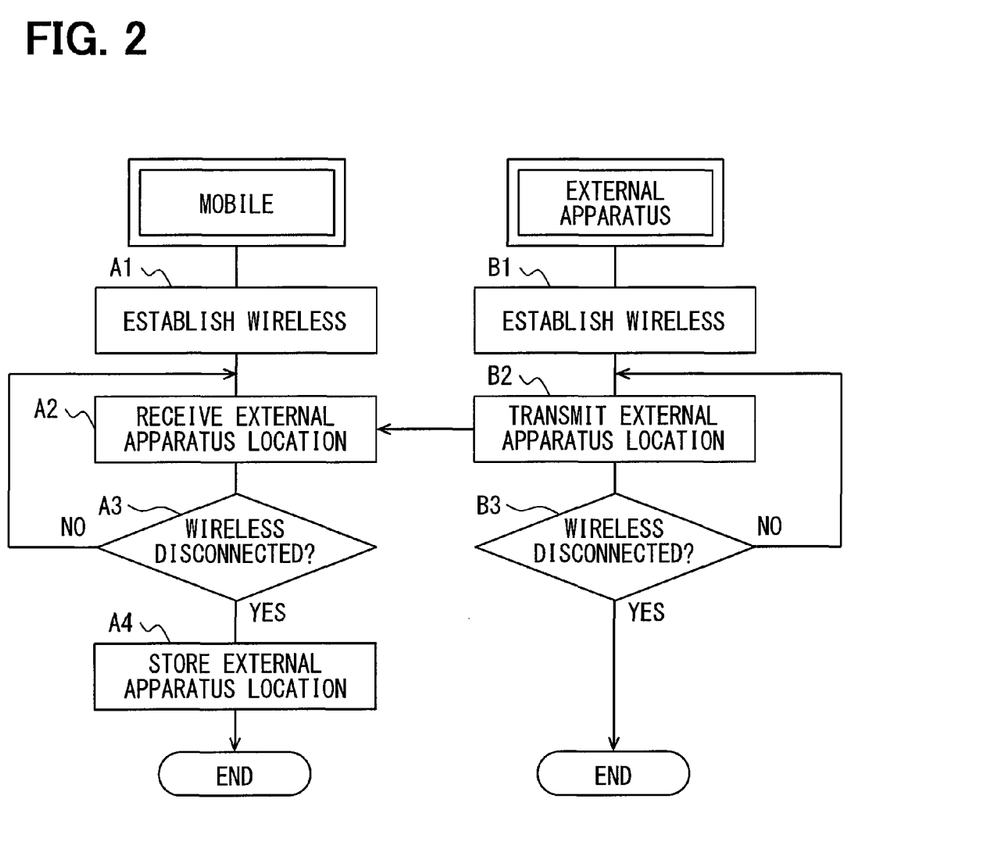
FIG. 2 is a flowchart illustrating a process of storing the location of the external apparatus.

When the mobile communication apparatus 100 is brought into the communication range of the external apparatus 200 while the wireless communication function is turned on, i.e., when the external apparatus 200 is within the communication range of the mobile communication apparatus 100 whose wireless communication function is turned on, the mobile communication apparatus 100 and the external apparatus 200 establish a wireless communication link (A1, B1) as in FIG. 2. The external apparatus 200 then constantly transmits the external apparatus location (external apparatus location information) to the mobile communication apparatus 100 (B2). In contrast, the mobile communication apparatus 100 constantly receives the external apparatus location from the external apparatus 200 (A2).

The mobile communication apparatus 100 continues to receive the external apparatus location until the wireless communication link is disconnected (A3: NO). When the wireless communication link is disconnected (A3: YES), the mobile communication apparatus 100 stores the latest external apparatus location received from the external apparatus 200 in the information storage portion 104 (A4), and then terminates the process. In contrast, the external apparatus 200 continues to transmit the external apparatus location until the wireless communication link is disconnected (B3: NO). When the wireless communication link is disconnected (B3: YES), the external apparatus 200 terminates the process. The wireless communication link may be either passively disconnected when the distance between the mobile communication apparatus 100 and the external apparatus 200 is beyond the communication range or actively disconnected when the mobile communication apparatus 100 or the external apparatus 200 performs a disconnection process.

(Process Performed when the Driver Enters the Vehicle)

Before a user carrying the mobile communication apparatus 100 enters the vehicle (while the user is away from the vehicle), the mobile communication apparatus 100 is outside the communication range of the external apparatus 200, and the external apparatus 200 is outside the communication range of the mobile communication apparatus 100. Therefore, the wireless communication link will not be established between the mobile communication apparatus 100 and the external apparatus 200 until the mobile communication apparatus 100 is brought into the communication range of the external apparatus 200, i.e., until the external apparatus 200 is within the communication range of the mobile communication apparatus 100. It is assumed that the wireless communication function of the mobile communication apparatus 100 is in the "off" state before the driver enters the vehicle.

Figure 3:
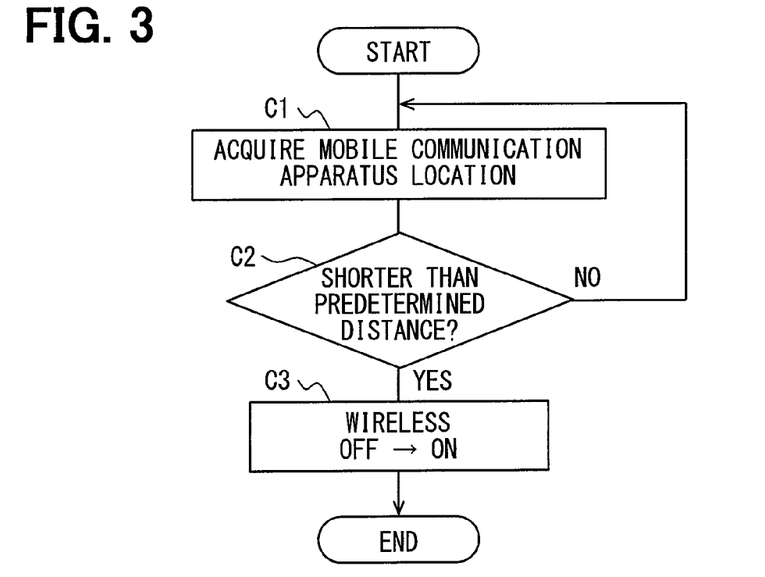
FIG. 3 is a flowchart illustrating a process performed when a driver enters a vehicle.

In this state, the mobile communication apparatus 100 acquires the mobile communication apparatus location (mobile communication apparatus location information) as in FIG. 3 (C1). The mobile communication apparatus 100 then determines whether the distance between the acquired mobile communication apparatus location and the external apparatus location currently stored in the information storage portion 104 (i.e., the external apparatus location retained the last time the driver exited the vehicle) is shorter than the predetermined distance (C2).

If the distance between the mobile communication apparatus location and the external apparatus location is shorter than the predetermined distance (C2: YES), the mobile communication apparatus 100 switches the wireless communication function of the mobile communication apparatus 100 from the "off" state to the "on" state (C3), and then terminates the process. Subsequently, the mobile communication apparatus 100 is brought into the range of communication with the external apparatus 200 to establish the wireless communication link with the external apparatus 200. If, by contrast, the distance between the mobile communication apparatus location and the external apparatus location is longer than the predetermined distance (C2: NO), the mobile communication apparatus 100 keeps the wireless communication function in the "off" state and acquires the mobile communication apparatus location again (C1).

(Process Performed when the Driver Exits the Vehicle)

Before the user carrying the mobile communication apparatus 100 exits the vehicle (while the user is still in the vehicle), the mobile communication apparatus 100 is within the communication range of the external apparatus 200 and the external apparatus 200 is within the communication range of the mobile communication apparatus 100. Therefore, the wireless communication link is established between the mobile communication apparatus 100 and the external apparatus 200 before the mobile communication apparatus 100 is brought out of the communication range of the external apparatus 200, i.e., before the external apparatus 200 is outside the communication range of the mobile communication apparatus 100. It is assumed that the wireless communication function of the mobile communication apparatus 100 is in the "on" state before the user exits the vehicle.

Figure 4:
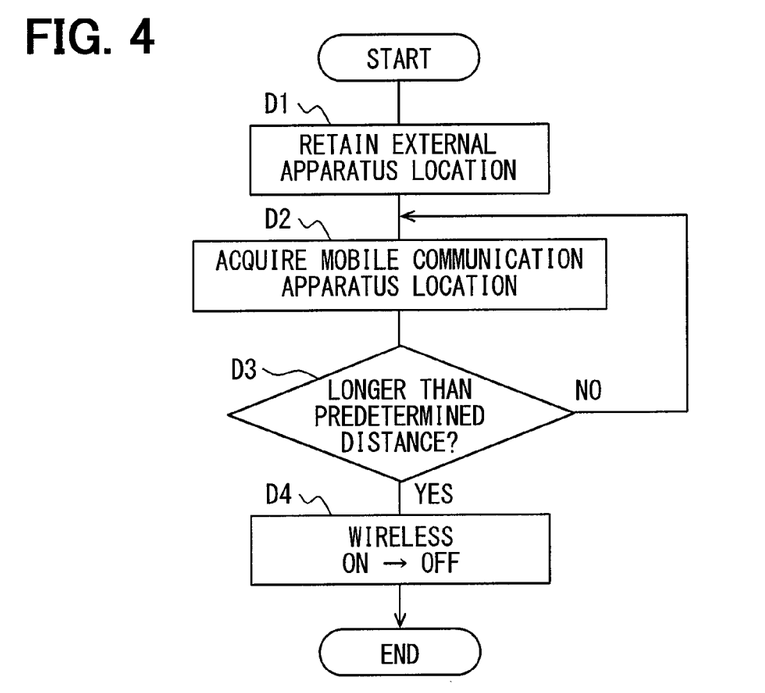
FIG. 4 is a flowchart illustrating a process performed when the driver exits the vehicle.

If, in this state, the user carrying the mobile communication apparatus 100 exits the vehicle to disconnect the wireless communication link, the mobile communication apparatus 100 retains the external apparatus location (stores the external apparatus location in the information storage portion 104) as in FIG. 4 (D1). In this instance, the mobile communication apparatus 100 retains the external apparatus location that was received from the external apparatus 200 when the wireless communication link was disconnected (see step A4). Subsequently, the mobile communication apparatus 100 acquires the mobile communication apparatus location (D2). The mobile communication apparatus then determines whether the distance between the acquired mobile communication apparatus location and the external apparatus location stored in the information storage portion 104 is longer than the predetermined distance (D3).

If the distance between the mobile communication apparatus location and the external apparatus location is longer than the predetermined distance (D3: YES), the mobile communication apparatus 100 switches the wireless communication function of the mobile communication apparatus 100 from the "on" state to the "off" state (D4), and then terminates the process. If, by contrast, the distance between the mobile communication apparatus location and the external apparatus location is shorter than the predetermined distance (D3: NO), the mobile communication apparatus 100 keeps the wireless communication function in the "on" state and acquires the mobile communication apparatus location again (D2).

Figure 5:
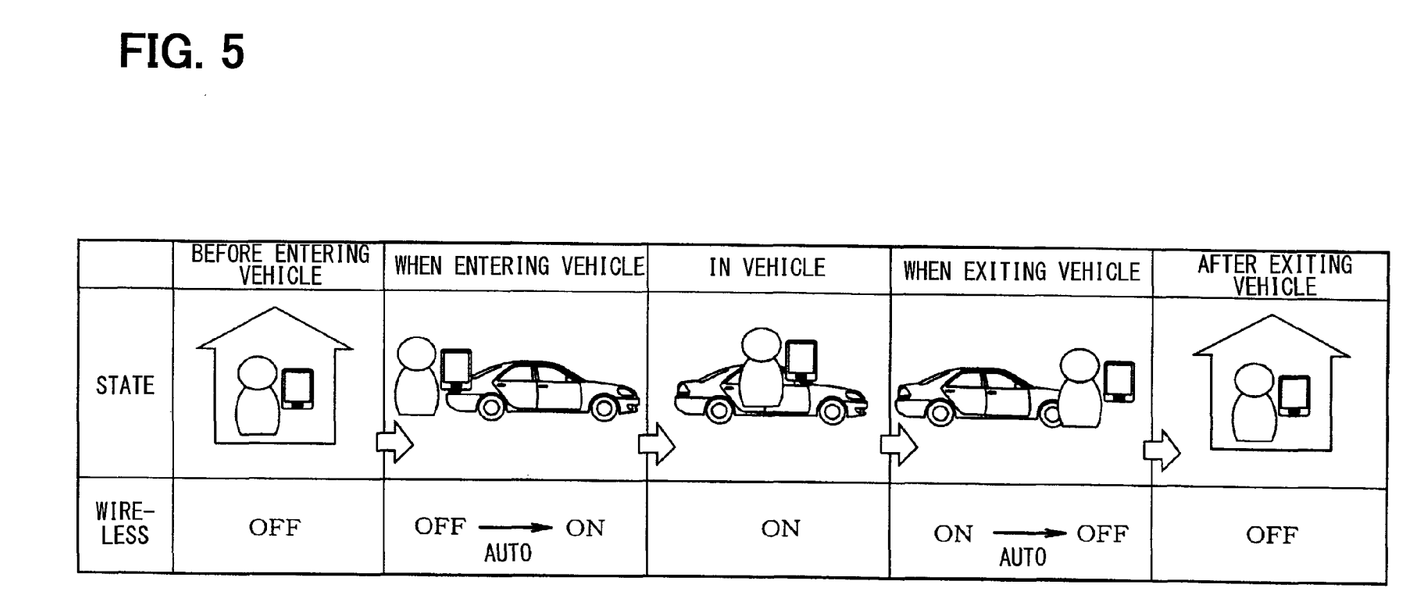
FIG. 5 is a diagram illustrating transitions between the "on" state and "off" state of a wireless communication function.

FIG. 5 illustrates how the wireless communication function switches between the "on" state and the "off" state during transitions, in order, of (i) before the user enters the vehicle, (ii) when the user enters the vehicle, (iii) while the user is in the vehicle (before the user exits the vehicle), (iv) when the user exits the vehicle, and (v) after the user has exited the vehicle. The wireless communication function of the mobile communication apparatus 100 is in the "off" state before the user enters the vehicle, automatically switched from the "off" state to the "on" state when the user enters the vehicle, and kept in the "on" state while the user is in the vehicle. In other words, the wireless communication function of the mobile communication apparatus 100 is kept in the "on" state as far as the distance between the location of the mobile communication apparatus 100 and the location of the external apparatus 200 remains shorter than the predetermined distance. The wireless communication function is automatically switched from the "on" state to the "off" state when the user exits the vehicle. After the user has exited the vehicle, the wireless communication function is kept in the "off" state. In other words, the wireless communication function of the mobile communication apparatus 100 is kept in the "off" state as far as the distance between the location of the mobile communication apparatus 100 and the location of the external apparatus 200 remains longer than the predetermined distance.

According to the first embodiment, the mobile communication apparatus 100 causes the external apparatus location storage processor 113 to store the external apparatus location acquired by the external apparatus location acquisition processor 112. If the distance between the mobile communication apparatus location acquired by the mobile communication apparatus location acquisition processor 111 and the external apparatus location stored by the external apparatus location storage processor 113 is shorter than the predetermined distance, i.e., if the mobile communication apparatus 100 is positioned near the external apparatus, the mobile communication apparatus 100 causes the wireless communication switching processor 114 to switch the wireless communication function from the "off" state to the "on" state. If the distance between the two apparatuses is longer than the predetermined distance, i.e., if the two apparatuses are positioned away from each other, the mobile communication apparatus 100 causes the wireless communication switching processor 114 to switch the wireless communication function from the "on" state to the "off" state.

In other words, the mobile communication apparatus 100 automatically switches the wireless communication function between the "on" state and the "off" state according to the distance between the pre-stored location of the external apparatus 200 and the location of the mobile communication apparatus 100 that moves together with the user. This saves the user from having to perform a manual switching procedure and enables to turn on or off the wireless communication function without sacrificing user-friendliness.

Further, the mobile communication apparatus 100 stores the external apparatus location that was acquired by the external apparatus location acquisition processor 112 when the wireless communication link established with the external apparatus 200 was disconnected. This enables to accurately turn on or off the wireless communication function according to the location of the external apparatus 200 that was acquired when the wireless communication link between the mobile communication apparatus 100 and the external apparatus 200 was disconnected.

Second Embodiment

Figure 6:
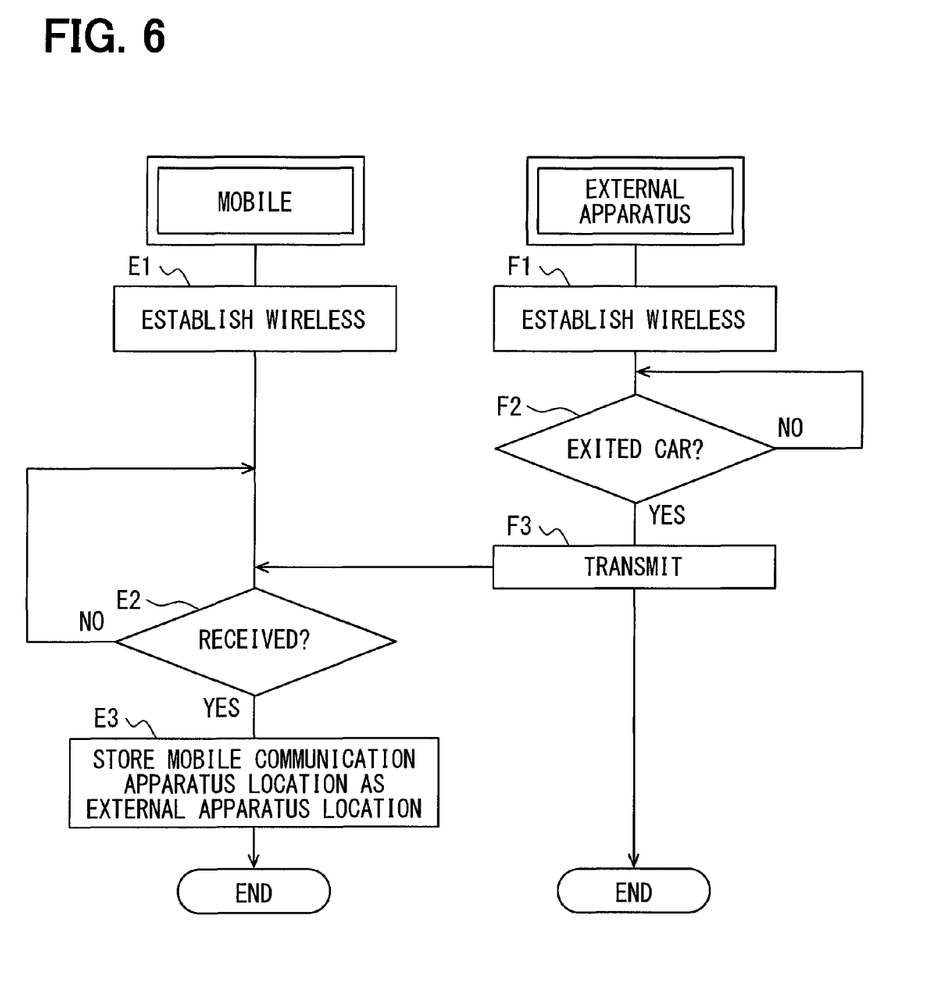
FIG. 6 is a flowchart illustrating a process of storing the location of the external apparatus according to a second embodiment.

A second embodiment will now be described. The second embodiment differs from the first embodiment in the process storing the external apparatus location. In the second embodiment, the information transmission processor 211 transmits vehicle exit information to the mobile communication apparatus 100 through the wireless communication portion 203 to indicate that the user has exited the vehicle. The vehicle exit information is generated by the control portion 201 when a detected behavior of the user implies that the user has exited the vehicle, i.e., when a door sensor (unshown) detects that a vehicle door is opened and closed (closed→open→closed), a door lock sensor (unshown) detects that a vehicle door is locked (locked→unlocked→locked), a parking brake (unshown) is manipulated, or a seat sensor of the vehicle is switched from the "on" state to the "off" state. The generated vehicle exit information is transmitted by the information transmission processor 211 immediately after generation or at the earliest possible timing after generation.

When the mobile communication apparatus 100 is brought into the communication range of the external apparatus 200 with the wireless communication function turned on, i.e., when the external apparatus 200 is placed within the communication range of the mobile communication apparatus 100 whose wireless communication function is turned on, the mobile communication apparatus 100 and the external apparatus 200 establish the wireless communication link (E1, F1). The external apparatus 200 then monitors whether the user has exited the vehicle (F2). If the external apparatus 200 detects that the user has exited the vehicle (F2: YES), the external apparatus 200 transmits the vehicle exit information to the mobile communication apparatus 100 (F3), and then terminates the process. If, in contrast, the mobile communication apparatus 100 receives the vehicle exit information (E2: YES), causes the information storage portion 104 to store the mobile communication apparatus location, which was acquired by the mobile communication apparatus location acquisition processor 111 when the vehicle exit information was received, as the external apparatus location (E3), and then terminates the process. In a process performed when the driver exits the vehicle in FIG. 4, if the mobile communication apparatus 100 receives the vehicle exit information from the external apparatus 200, the mobile communication apparatus location acquired when the vehicle exit information is received is retained as the external apparatus location (see step D1).

The present embodiment also enables to turn on or off the wireless communication function without requiring the user to perform a manual switching procedure. This ensures that user-friendliness remains intact. Further, when the mobile communication apparatus 100 receives the vehicle exit information, which is predetermined information, from the external apparatus 200, the mobile communication apparatus 100 stores the mobile communication apparatus location, which was acquired by the mobile communication apparatus location acquisition processor 111 when the vehicle exit information was received, as the external apparatus location, instead of the external apparatus location acquired by the external apparatus location acquisition processor 112. Thus, the location of the mobile communication apparatus 100 that is acquired when the user exits the vehicle can be fictitiously regarded as the location of the external apparatus 200. This enables to accurately turn on or off the wireless communication function on the basis of that location. The predetermined information from the external apparatus 200 is not limited to the vehicle exit information. Alternatively, the predetermined information may be destination arrival information indicating that the vehicle has arrived at a destination designated by a route guidance or vehicle stop information indicating that the vehicle has stopped for a predetermined period of time or longer.

Third Embodiment

A third embodiment will now be described. The third embodiment is characterized by a wireless communication function automatic turn-off process, which is performed after the wireless communication function is turned on. More specifically, as in FIG. 7, when the wireless communication switching processor 114 switches the wireless communication function from the "off" state to the "on" state (G1), the mobile communication apparatus 100 causes a timer circuit (unshown) to start counting the elapsed time after switching (G2). While continuously counting the elapsed time, the mobile communication apparatus 100 monitors whether wireless communication with the external apparatus 200 is started, i.e., whether various information is transmitted/received though the wireless communication link (G3). If the wireless communication is started (G3: YES), the mobile communication apparatus 100 stops counting the elapsed time (G4), and then terminates the process.

Figure 7:
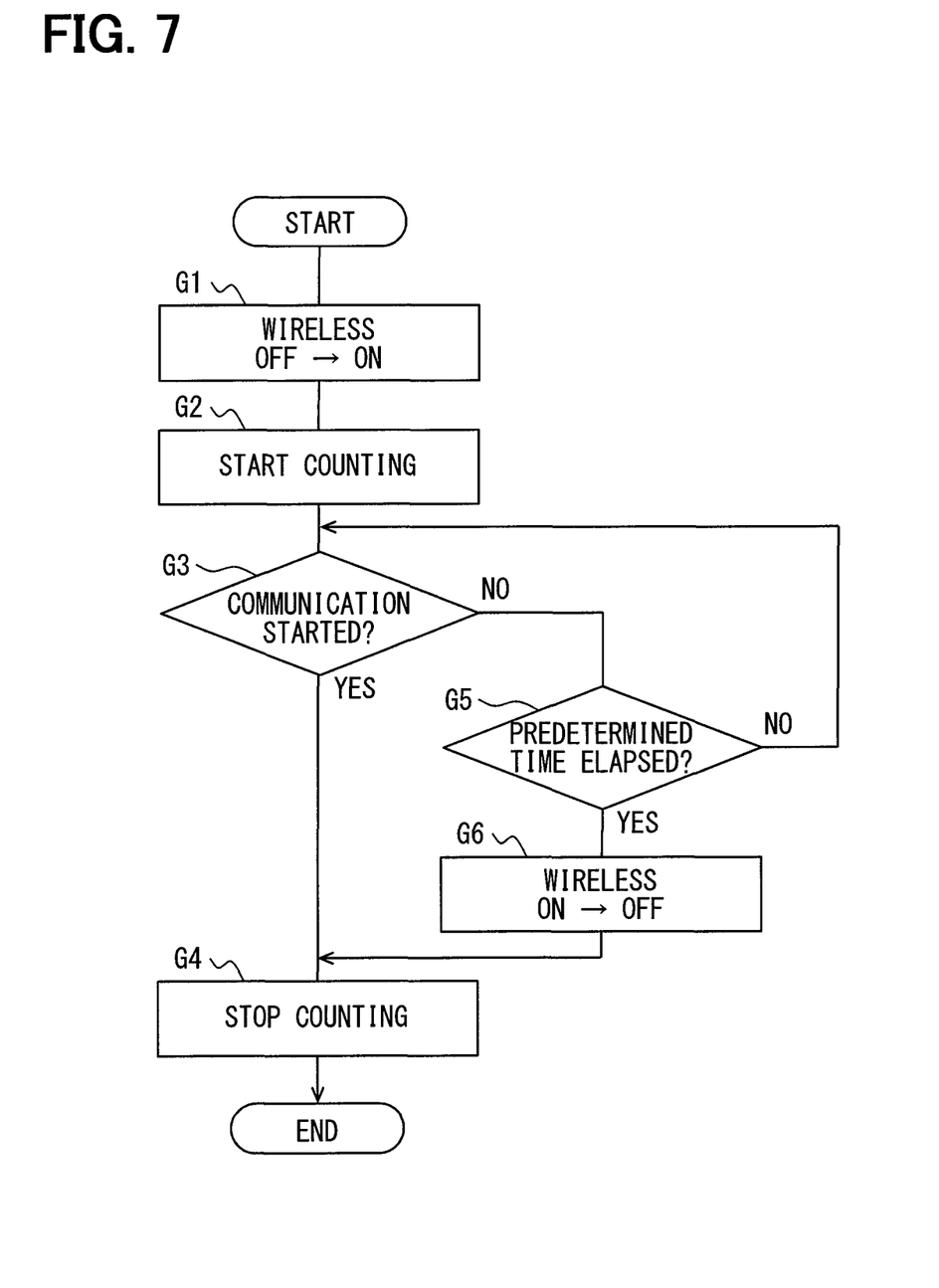
FIG. 7 is a flowchart illustrating a process of automatically turning off the wireless communication function according to a third embodiment.

If, by contrast, the wireless communication is not started (G3: NO), the mobile communication apparatus 100 determines whether a predetermined period of time is exceeded by the elapsed time, i.e., whether the predetermined period of time has elapsed after the wireless communication function is switched from the "off" state to the "on" state (G5). The predetermined period of time can be changed as appropriate. However, the predetermined period of time is initially set to be approximately 10 minutes. If the predetermined period of time has not elapsed (G5: NO), the mobile communication apparatus 100 monitors again whether the wireless communication is started (G3). If the predetermined period of time has elapsed (G5: YES), the mobile communication apparatus 100 causes the wireless communication switching processor 114 to automatically switch the wireless communication function from the "on" state to the "off" state (G6). Further, the mobile communication apparatus 100 stops counting the elapsed time (G4), and then terminates the process.

According to the present embodiment, if the wireless communication with the external apparatus 200 is not started within the predetermined period of time after the wireless communication function is switched from the "off" state to the "on" state, the mobile communication apparatus 100 automatically switches the wireless communication function from the "on" state to the "off" state. Suppose that the mobile communication apparatus 100 is positioned close to the external apparatus 200 to turn on the wireless communication function although the user does not intend to use the wireless communication function. Even in such a case, the present embodiment ensures that the wireless communication function can be automatically turned off. As a result, a battery in the mobile communication apparatus 100 can be prevented from being wasted.

Alternative Embodiments

The present disclosure is not limited to the embodiments, but is applicable to various other embodiments without departing from the spirit of the present disclosure. For example, the external apparatus 200 may be a household electrical appliance other than the mobile communication apparatus 100. Further, a plurality of embodiments can be combined for implementation purposes.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A mobile communication apparatus having a wireless communication function of wirelessly communicating with an external apparatus, comprising:
   a first location acquisition processor that acquires a location of the mobile communication apparatus itself as a mobile communication apparatus location;
   a second location acquisition processor that acquires a location of the external apparatus from the external apparatus as an external apparatus location;
   a second location storage processor that stores the external apparatus location acquired by the second location acquisition processor as a subject apparatus location; and
   a wireless communication switching processor that
      switches the wireless communication function from OFF state to ON state when a distance between the mobile communication apparatus location acquired by the first location acquisition processor and the subject apparatus location stored by the second location storage processor is shorter than a predetermined distance, and switches the wireless communication function from ON state to OFF state when the distance between the mobile communication apparatus location acquired by the first location acquisition processor and the subject apparatus location stored by the second location storage processor is longer than the predetermined distance, wherein, in case that predetermined information is received from the external apparatus, the predetermined information from the external apparatus indicating a state causing the mobile communication apparatus and the external apparatus to start to distance from each other, the second location storage processor stores, as the subject apparatus location, the mobile communication apparatus location that is acquired by the first location acquisition processor at a time when the predetermined information is received, instead of the external apparatus location acquired by the second location acquisition processor.

2. The mobile communication apparatus according to claim 1, wherein the second location storage processor stores, as the subject apparatus location, the external apparatus location that is acquired by the second location acquisition processor at a time when a wireless communication link established with the external apparatus is disconnected.

3. The mobile communication apparatus according to claim 1, wherein:

the external apparatus is a vehicle apparatus mounted in a vehicle; and the second location storage processor receives vehicle exit information from the vehicle apparatus as the predetermined information, the vehicle exit information being indicative that a user has exited the vehicle.

4. The mobile communication apparatus according to claim 1, wherein the wireless communication switching processor switches the wireless communication function from ON state to OFF state in case that wireless communication is not established with the external apparatus within a predetermined period of time after the wireless communication function is switched from OFF state to ON state.

5. The mobile communication apparatus according to claim 1, wherein:

the external apparatus is a vehicle apparatus mounted in a vehicle; and the predetermined information is vehicle exit, vehicle destination arrival or vehicle stop information.

6. A non-transitory computer-readable storage medium including a program product used in a mobile communication apparatus having a wireless function performing a wireless communication with an external apparatus, the program product comprising instructions for execution by a computer, the instructions comprising:

acquiring, as a first apparatus location, a location of the mobile communication apparatus itself;

acquiring, as a second apparatus location, a location of the external apparatus from the external apparatus;

storing, as a subject apparatus location, the second apparatus location acquired in the acquiring of the second apparatus location; and switching the wireless communication function from OFF state to ON state when a distance between the first apparatus location acquired in the acquiring of the first apparatus location and the subject apparatus location stored in the storing of the subject apparatus location is shorter than a predetermined distance, while switching the wireless communication function from ON state to OFF state when the distance between the first apparatus location acquired in the acquiring of the first apparatus location and the subject apparatus location stored in the storing of the subject apparatus location is longer than the predetermined distance, wherein, in case that predetermined information indicating a state causing the mobile communication apparatus and the external apparatus to start to distance from each other is received from the external apparatus, in the storing of the subject apparatus location, the location of the mobile communication apparatus that is acquired in the acquiring of the first apparatus location at a time when the predetermined information is received is stored as the subject apparatus location, instead of the location of the external apparatus that is acquired in the acquiring of the second apparatus location.

7. The mobile communication apparatus according to claim 6, wherein:

the external apparatus is a vehicle apparatus mounted in a vehicle; and the predetermined information is vehicle exit, vehicle destination arrival or vehicle stop information.

8. A mobile communication apparatus having a wireless communication function of wirelessly communicating with an external apparatus, comprising:

a first location acquisition processor that acquires a location of the mobile communication apparatus itself as a mobile communication apparatus location;

a second location acquisition processor that acquires a location of the external apparatus from the external apparatus as an external apparatus location;

a second location storage processor that stores the external apparatus location acquired by the second location acquisition processor as a subject apparatus location; and a wireless communication switching processor that
switches the wireless communication function from OFF state to ON state when a distance between the mobile communication apparatus location acquired by the first location acquisition processor and the subject apparatus location stored by the second location storage processor is shorter than a predetermined distance, and switches the wireless communication function from ON state to OFF state when the distance between the mobile communication apparatus location acquired by the first location acquisition processor and the subject apparatus location stored by the second location storage processor is longer than the predetermined distance, wherein, in case that predetermined information is received from the external apparatus, the second location storage processor stores, as the subject apparatus location, the mobile communication apparatus location that is acquired by the first location acquisition processor at a time when the predetermined information is received, instead of the external apparatus location acquired by the second location acquisition processor, and wherein:

the external apparatus is a vehicle apparatus mounted in a vehicle; and the predetermined information is vehicle exit, vehicle destination arrival or vehicle stop information.

9. The mobile communication apparatus according to claim 8, wherein
the second location storage processor stores, as the subject apparatus location, the external apparatus location that is acquired by the second location acquisition processor at a time when a wireless communication link established with the external apparatus is disconnected.

10. The mobile communication apparatus according to claim 8, wherein
the wireless communication switching processor switches the wireless communication function from ON state to OFF state in case that wireless communication is not established with the external apparatus within a predetermined period of time after the wireless communication function is switched from OFF state to ON state.

\* \* \* \* \*